US008121715B2

(12) United States Patent
Lin et al.

(10) Patent No.: US 8,121,715 B2

(45) Date of Patent: Feb. 21, 2012

(54) RADIO SIGNAL TRANSMITTER AND RELATED METHOD AND MULTIMEDIA SYSTEM FOR AN AUDIO SOURCE GENERATOR

(75) Inventors: Tzu-Ping Lin, Taipei Hsien (TW); Pao-Wen Chen, Taipei Hsien (TW); Tsung-Chin Tsai, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 810 days.

(21) Appl. No.: 12/241,089

(22) Filed: Sep. 30, 2008

(65) Prior Publication Data

US 2009/0187262 A1 Jul. 23, 2009

(30) Foreign Application Priority Data

Jan. 18, 2008 (TW) ............................... 97101951 A

(51) Int. Cl.
*G06F 17/00* (2006.01)

(52) U.S. Cl. ........................................................ 700/94

(58) Field of Classification Search .................... 700/94; 455/3.06, 41.2, 63.3, 452.1, 509, 90.2

See application file for complete search history.

(56) References Cited

U.S. PATENT DOCUMENTS

| | | | | |
|---|---|---|---|---|
| 7,512,380 | B2 * | 3/2009 | McGowan | 455/63.3 |
| 2004/0117442 | A1 * | 6/2004 | Thielen | 709/203 |
| 2005/0119001 | A1 | 6/2005 | Watanabe | |
| 2005/0249355 | A1 | 11/2005 | Chen | |
| 2008/0287065 | A1 * | 11/2008 | Eklund et al. | 455/42 |
| 2009/0163148 | A1 * | 6/2009 | Haghighi et al. | 455/75 |

FOREIGN PATENT DOCUMENTS

TW 595238 6/2004

* cited by examiner

*Primary Examiner* — Andrew C Flanders

(74) *Attorney, Agent, or Firm* — Winston Hsu; Scott Margo

(57) ABSTRACT

A radio signal transmitter for an audio source generator includes a reception antenna for receiving a plurality of broadcasting signals, a decision unit coupled to the reception antenna for determining intensities of the plurality of broadcasting signals received by the reception antenna, a selection unit coupled to the decision unit for determining an operating frequency according to a decision result of the decision unit, a modulation unit coupled to the selection unit and the audio source generator for transforming an audio signal provided by the audio source generator into a broadcasting signal according to the operating frequency determined by the selection unit, and a transmission antenna coupled to the modulation unit for emitting the broadcasting signal outputted from the modulation unit in the air.

11 Claims, 4 Drawing Sheets

RADIO SIGNAL TRANSMITTER AND RELATED METHOD AND MULTIMEDIA SYSTEM FOR AN AUDIO SOURCE GENERATOR

BACKGROUND OF THE INVENTION

1. Field of the Invention

The present invention relates to a radio signal transmitter, related method, and related multimedia system for an audio source generator, and more particularly, to a radio signal transmitter, related method, and related multimedia system for avoiding degradation of audio output quality or influence on other people when receiving broadcasting programs.

2. Description of the Prior Art

Portable multimedia players, such as MP3 (MPEG-1 Audio Layer 3) or CD (Compact Disc) players, etc., can output video and audio signals at any time and in any place. Generally, a portable multimedia player comprises a specific audio output interface for outputting audio signals to an external audio player. For example, an MP3 portable player includes a 3.5 mm audio jack in order to output audio signals to audio output devices, such as speakers or headphones.

Therefore, using the portable multimedia player, a user can enjoy multimedia interaction on the go. However, in some cases, portable multimedia player may not output audio signals through the predetermined output interface. For example, a vehicle multimedia player can be utilized for playing CD, AM, or FM broadcasting programs, etc., but the vehicle multimedia player may not have external interfaces or have improper external interfaces, which do not conform to a format of the use's MP3 player. In other words, the user cannot play audio signals in the MP3 player via the vehicle multimedia player. In such a condition, in order to expand functions of the vehicle multimedia player, the prior art provides an electronic device, which outputs audio signals to the vehicle multimedia player via frequency modulation (FM) channel.

Please refer to FIG. 1. FIG. 1 is a schematic diagram of a prior art FM output device 10. The FM output device 10 is installed between an audio source generator 12 and a vehicle multimedia player 14, and utilized for transforming audio signals provided by the audio source generator 12 into FM signals for the vehicle multimedia player 14. The audio source generator 12 can be an MP3 player or a CD player, and comprises an audio generating device 120 and an output interface 122. The audio generating device 120 outputs audio signals to the FM output device 10 via the output interface 122 (e.g. 3.5 mm audio jack). The FM output device 10 includes a receiving interface 100, a modulation unit 102, a transmission antenna 104, and a switching unit 106. The receiving interface 100 can be connected with the output interface 122 for receiving the audio signals provided by the audio source generator 12. The modulation unit 102 is coupled to the receiving interface 100, and utilized for modulating the audio signals into FM signals, so as to emit the FM signals via the transmission antenna 104. The switching unit 106 is utilized for switching frequencies of the FM signals outputted from the modulation unit 102. On the other hand, the vehicle multimedia player 14 includes an audio player device 140, a demodulation unit 142, a reception antenna 144, and a switching unit 146. After the FM output device 10 outputs FM signals via a specific frequency, a user can switch a frequency of the demodulation unit 142 through the switching unit 146, so that the demodulation unit 142 can receive the FM signals provided by the FM output device 10 via reception antenna 144, and demodulate the FM signals. Then, the audio player device 140 can play the demodulated FM signals.

Therefore, using the FM output device 10, the user can adjust the operating frequencies of the modulation unit 102 and the demodulation unit 142 to the same frequency via the switching units 106, 146, so as to play audio signals provided by the audio source generator 12 through the vehicle multimedia player 14. However, such operating approach mentioned above has its limitation; that is, the user must avoid adjusting the operating frequencies of the modulation unit 102 and the demodulation unit 142 to a frequency of a broadcasting program. If the user adjusts the operating frequencies of the modulation unit 102 and the demodulation unit 142 to a frequency of a broadcasting program, signals of the broadcasting program will interfere with the FM signals outputted from the FM output device 10 and affect the output effect of the vehicle multimedia player 14. Meanwhile, the FM signals outputted from the FM output device 10 may affect neighboring vehicle multimedia players when receiving the broadcasting programs. However, there are many broadcasting programs in the air at the same time, and frequencies used by the broadcasting programs may be different in different area, so that the user may easily adjust the operating frequencies of the modulation unit 102 and the demodulation unit 142 to a wrong frequency, i.e. a frequency utilized for a broadcasting program, causing degradation of the audio output quality, or influence on other people when receiving broadcasting programs.

In short, using the prior art FM output device 10, the user blindly chooses the operating frequencies of the modulation unit 102 and the demodulation unit 142 without any reference, leading to degradation of audio output quality, influence on other people when receiving broadcasting programs, as well as inconvenience.

SUMMARY OF THE INVENTION

It is therefore a primary objective of the claimed invention to provide a radio signal transmitter, related method and related multimedia system for an audio source generator.

The invention discloses a radio signal transmitter for an audio source generator, which comprises a reception antenna for receiving a plurality of broadcasting signals, a decision unit coupled to the reception antenna for determining intensities of the plurality of broadcasting signals received by the reception antenna, a selection unit coupled to the decision unit for determining an operating frequency according to a decision result of the decision unit, a modulation unit coupled to the selection unit and the audio source generator for transforming an audio signal provided by the audio source generator into a broadcasting signal according to the operating frequency determined by the selection unit, and a transmission antenna coupled to the modulation unit for emitting the broadcasting signal outputted from the modulation unit in the air.

The invention further discloses a method for outputting an audio signal of an audio source generator, which comprises receiving a plurality of broadcasting signals, determining intensities of the plurality of broadcasting signals, determining an operating frequency according to the intensities of the plurality of broadcasting signals, transforming the audio signal provided by the audio source generator into a broadcasting signal according to the operating frequency, and emitting the broadcasting signal.

The invention further discloses a multimedia system, which comprises an audio source generator for outputting an audio signal, an audio player device for receiving and playing frequency modulation broadcasting signals, and a radio signal transmitter coupled to the audio source generator, the radio signal transmitter comprises a receiving end coupled to the audio source generator for receiving the audio signal provided by the audio source generator, a reception antenna for receiving a plurality of broadcasting signals, a decision unit coupled to the reception antenna for determining intensities of the plurality of broadcasting signals received by the reception antenna, a selection unit coupled to the decision unit for determining an operating frequency according to a decision result of the decision unit, a modulation unit coupled to the receiving end and the selection unit for transforming the audio signal provided by the audio source generator into a broadcasting signal according to the operating frequency determined by the selection unit, and a transmission antenna coupled to the modulation unit for emitting the broadcasting signal outputted from the modulation unit to the audio player device in order to play the broadcast signal by the audio player device.

These and other objectives of the invention will no doubt become obvious to those of ordinary skill in the art after reading the following detailed description of the preferred embodiment that is illustrated in the various figures and drawings.

DETAILED DESCRIPTION

Figure 1:
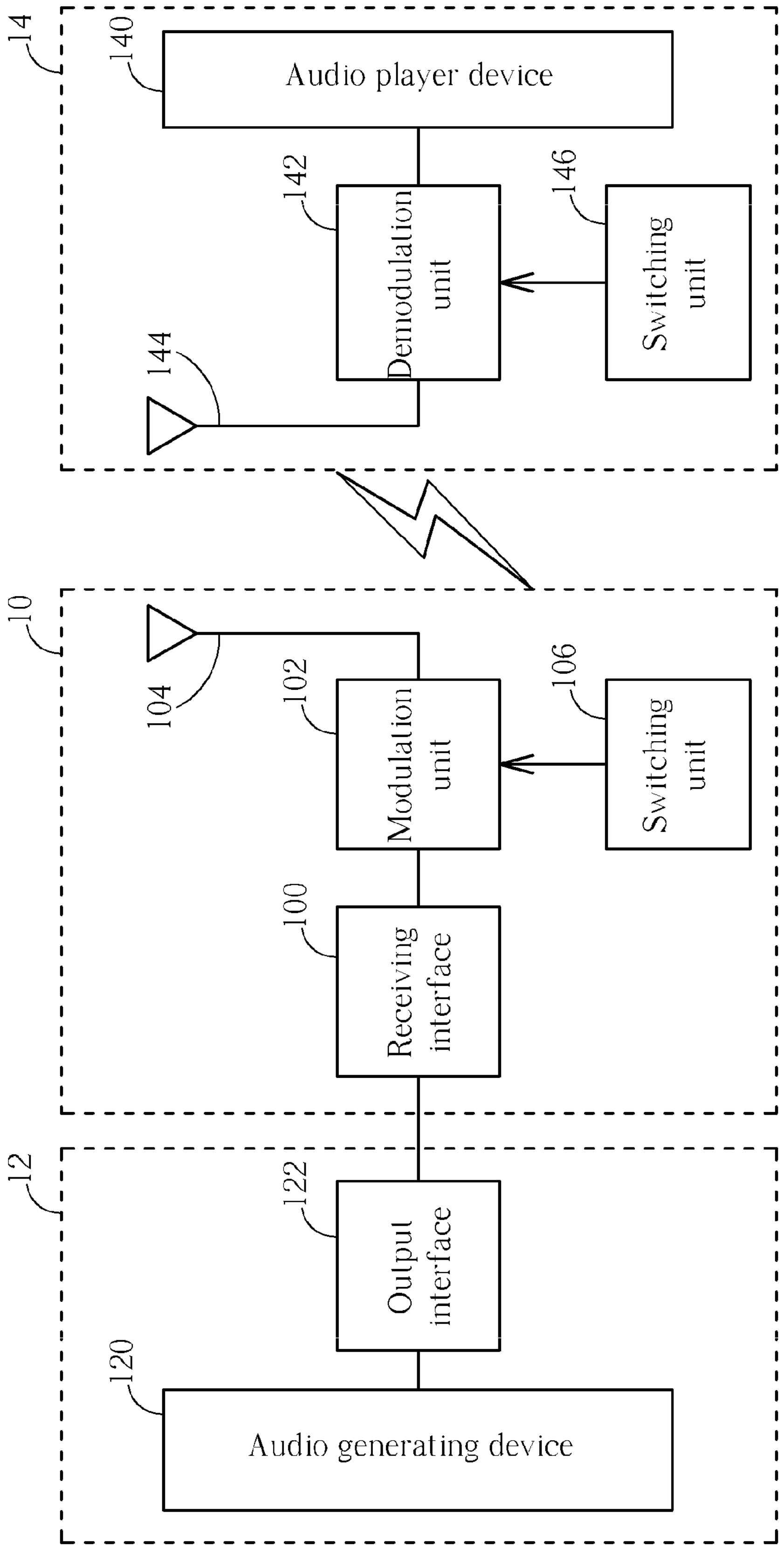
FIG. 1 PRIOR ART
FIG. 1 is a schematic diagram of a frequency modulation output device in the prior art.
Figure 2:
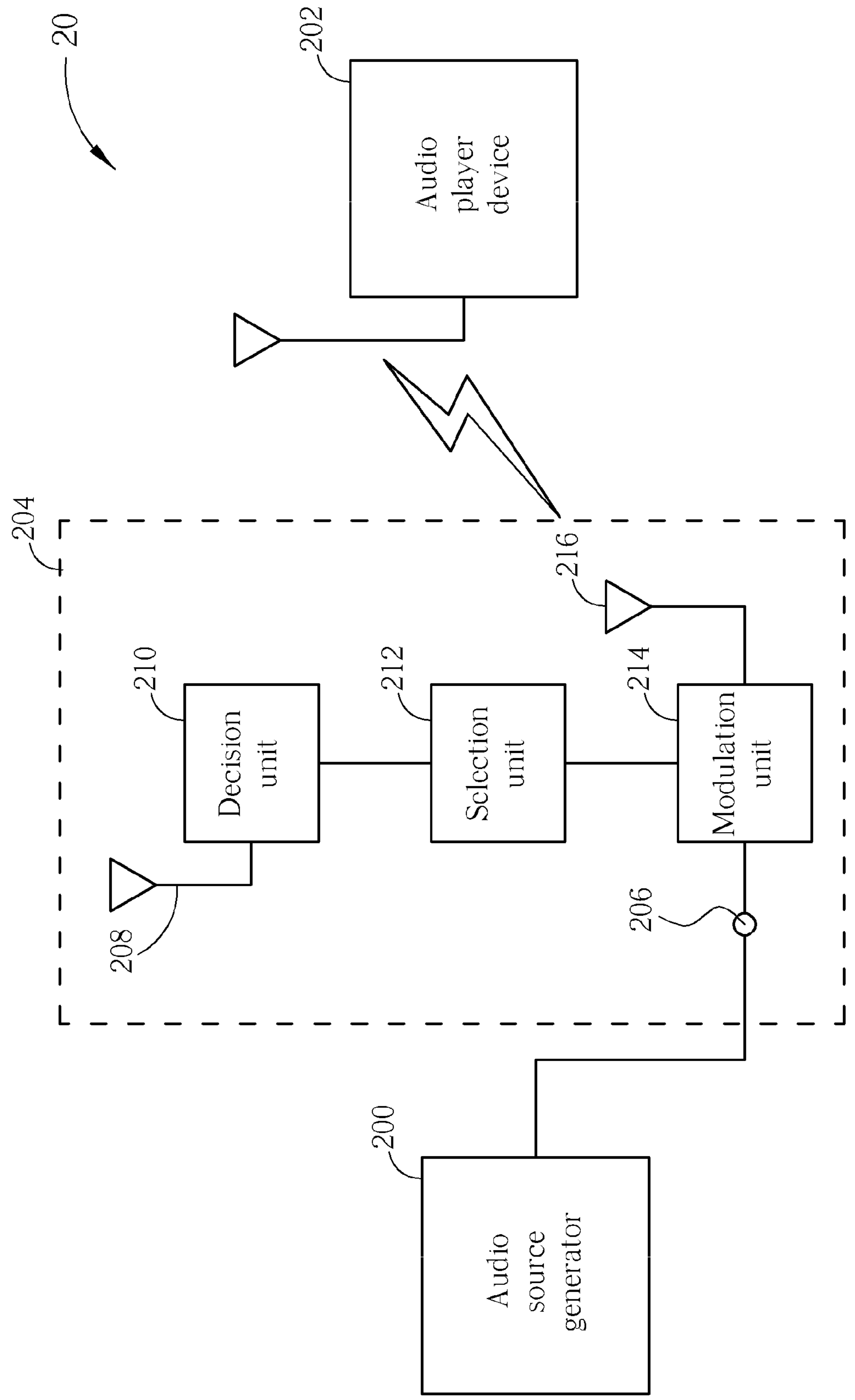
FIG. 2 is a schematic diagram of a multimedia system according to an embodiment of the invention.

Please refer to FIG. 2. FIG. 2 is a schematic diagram of a multimedia system 20 according to an embodiment of the invention. The multimedia system 20 includes an audio source generator 200, an audio player device 202, and a radio signal transmitter 204. The audio source generator 200 is utilized for outputting audio signals. The audio source generator 200 can be an electronic device capable of outputting audio signals, such as MP3 player, CD player, PDA, etc., and is not limited to any of them. The audio player device 202 is capable of receiving and playing broadcasting signals, which can be a vehicle or a home-use multimedia player, and is not limited to any of them. The radio signal transmitter 204 is coupled to the audio source generator 200, and utilized for modulating the audio signals generated by the audio source generator 200 into broadcasting signals and emitting the broadcasting signals for the audio player device 202 to play the audio signals.

In FIG. 2, the audio signal transmitter 204 includes a reception end 206, a reception antenna 208, a decision unit 210, a selection unit 212, a modulation 214 and a transmission antenna 216. The receiving end 206 conforms to a format of a specific connection interface, and utilized for connecting to the audio source generator 200 in order to receive the audio signals outputted from the audio source generator 200. The decision unit 210 is coupled to the reception antenna 208, and utilized for receiving broadcasting signals via the reception antenna 208 in order to determine intensities of the broadcasting signals. The selection unit 212 is coupled to the decision unit 210, and utilized for determining an operating frequency according to a decision result of the decision unit 210. The modulation unit 214 is coupled to the receiving end 206, the selection unit 212, and the transmission antenna 216, and utilized for transforming the audio signals provided by the audio source generator 200 into broadcasting signals according to the operating frequency determined by the selection unit 212, in order to emit to the audio player device 202 via the transmission antenna 216 and play the audio signals by the audio player device 202.

Figure 3:
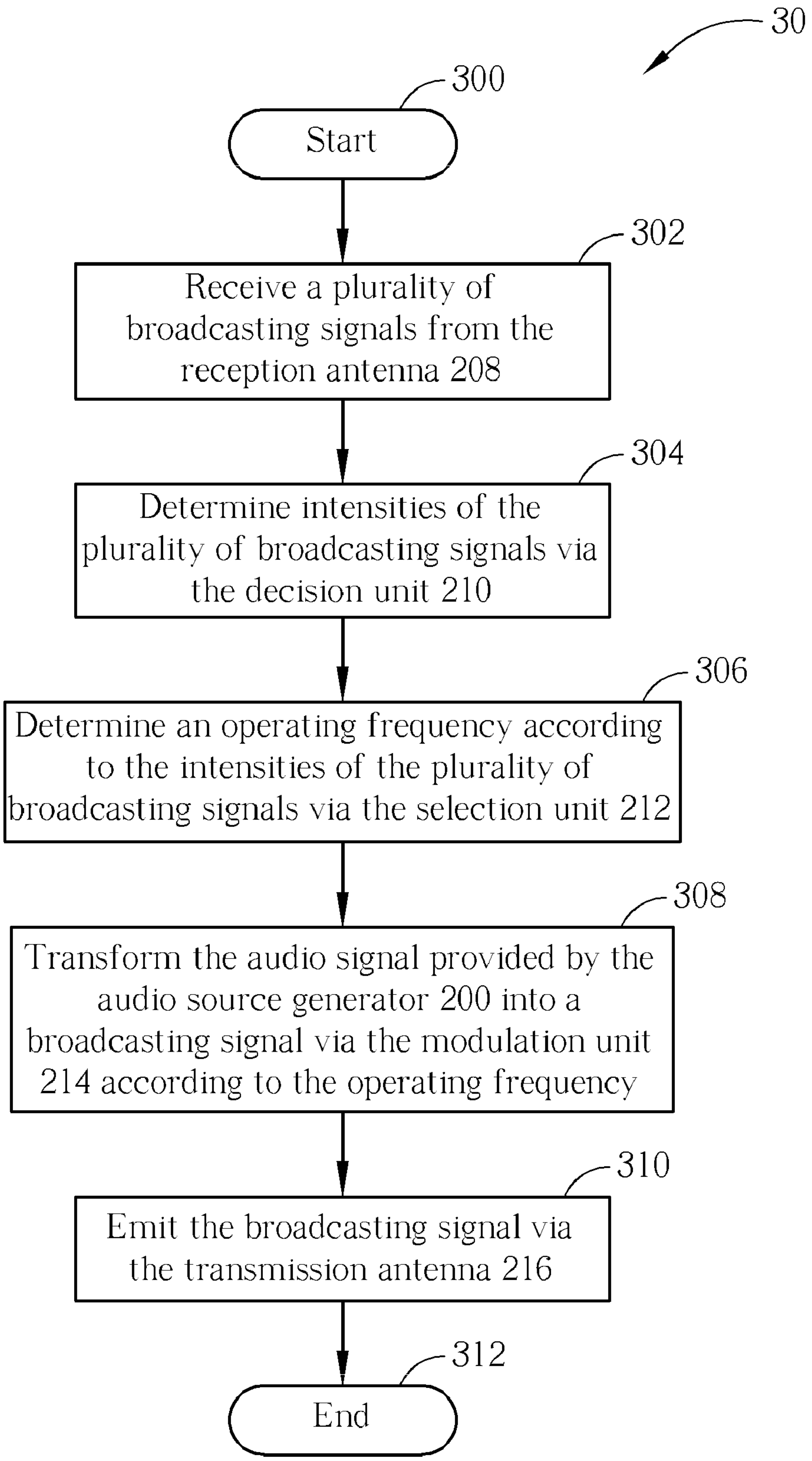
FIG. 3 is a schematic diagram of a procedure according to an embodiment of the invention.

As to an operating procedure of the radio signal transmitter 204 shown in FIG. 2, please refer to FIG. 3. FIG. 3 is a schematic diagram of a procedure 30 according to an embodiment of the invention. The procedure 30 is utilized for outputting the audio signals provided by the audio source generator 200 in the radio signal transmitter 204, and comprises the following steps:

Step 300: Start.

Step 302: Receive a plurality of broadcasting signals from the reception antenna 208.

Step 304: Determine intensities of the plurality of broadcasting signals via the decision unit 210.

Step 306: Determine an operating frequency according to the intensities of the plurality of broadcasting signals via the selection unit 212.

Step 308: Transform the audio signal provided by the audio source generator 200 into a broadcasting signal via the modulation unit 214 according to the operating frequency.

Step 310: Emit the broadcasting signal via the transmission antenna 216.

Step 312: End.

As can be seen, the invention is able to determine a frequency of a broadcasting signal outputted from the modulation unit 214 according to the intensities of the broadcasting signals. Preferably, the invention can choose a broadcasting frequency with lower or the lowest power as the operating frequency of the modulation unit 214, in order to avoid degradation of audio output quality due to broadcasting interference or influence on other people when receiving broadcasting programs.

Figure 4:
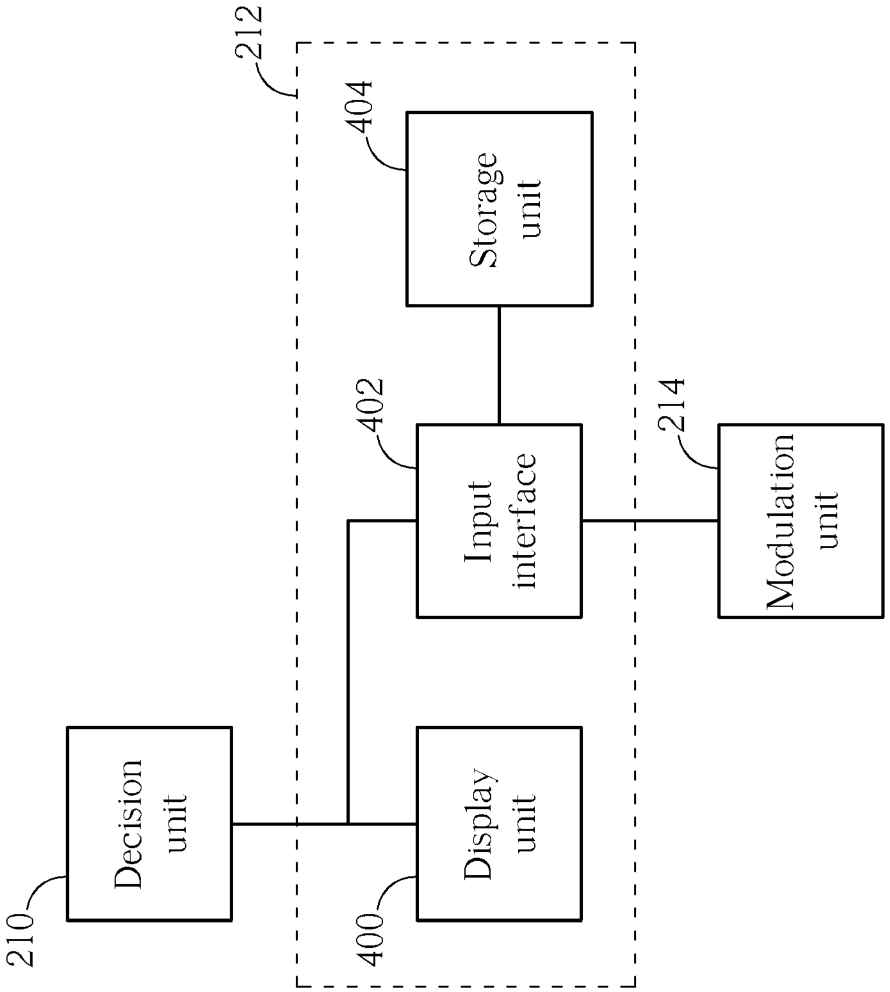
FIG. 4 is a schematic diagram of the selection unit shown in FIG. 2 according to an embodiment of the invention.

Note that, the multimedia system 20 is an exemplary embodiment of the invention, and those skilled in the art can make alternations and modifications accordingly. For example, please refer to FIG. 4. FIG. 4 is a schematic diagram of the selection unit 212 shown in FIG. 2 according to an embodiment of the invention. The selection unit 212 includes a display unit 400, an input interface 402, and a storage unit 404. The display unit 400 is coupled to the decision unit 210, and utilized for displaying the decision result of the decision unit 210, such that the user is capable of outputting a control signal through the input interface 402 according to the decision result displayed on the display unit 400, in order to determine the operating frequency of modulation unit 214. Preferably, the display unit 400 displays frequencies corresponding to broadcasting signals having intensities smaller than a predetermined value among the plurality of broadcasting signals received by the reception antenna 208 according to the decision result of the decision unit 210. The predetermined value can be a fixed value or can change according to the intensities of the plurality of broadcasting signals, such as the average of the intensities of the plurality of broadcasting signals. Besides, the storage unit 404 is capable of storing the determination result of the user as reference.

Moreover, multimedia system 20 can further include a storage unit for storing the decision result of decision unit 210 or available frequencies predetermined by the user as reference.

Therefore, in the multimedia system 20, the radio signal transmitter 204 is capable of providing information about the operating frequency for the user according to the intensities of the plurality of broadcasting signals, so as to avoid degradation of audio output quality due to interference of broadcasting programs or influence on other people when receiving broadcasting programs. Note that, in the invention, the radio signal transmitter 204 preferably applies the FM technique to modulate the audio signals outputted by the audio source generator 200, and certainly, those skilled in the art can utilize other modulation approaches to modulate the audio signals.

In conclusion, the user can choose a frequency with the least interference as a modulation frequency, in order to avoid degradation of audio output quality or influence on other people when receiving broadcasting programs.

Those skilled in the art will readily observe that numerous modifications and alterations of the device and method may be made while retaining the teachings of the invention.

What is claimed is:

1. A radio signal transmitter for an audio source generator comprising:

a reception antenna for receiving a plurality of broadcasting signals;

a decision unit coupled to the reception antenna for determining intensities of the plurality of broadcasting signals received by the reception antenna;

a selection unit for determining an operating frequency according to a decision result of the decision unit, comprising:

a display unit coupled to the decision unit for displaying frequencies corresponding to broadcasting signals having intensities smaller than a predetermined value among the plurality of broadcasting signals according to the decision result of the decision unit; and an input interface coupled to the decision unit and the modulation unit for receiving signals outputted from a user in order to determine the operating frequency;

a modulation unit coupled to the selection unit and the audio source generator for transforming an audio signal provided by the audio source generator into a broadcasting signal according to the operating frequency determined by the selection unit; and a transmission antenna coupled to the modulation unit for emitting the broadcasting signal outputted from the modulation unit in the air;

wherein the predetermined value changes according to the intensities of the plurality of broadcasting signals.

2. The radio signal transmitter of claim 1, wherein the predetermined value is a fixed value.

3. The radio signal transmitter of claim 1 further comprising a storage unit coupled to the input interface for storing a determination result of the user.

4. The radio signal transmitter of claim 1 further comprising a storage unit coupled to the decision unit for storing the decision result of the decision unit.

5. A method for outputting an audio signal of an audio source generator comprising:

receiving a plurality of broadcasting signals;

determining intensities of the plurality of broadcasting signals;

setting a predetermined value according to the intensities of the plurality of broadcasting signals;

displaying frequencies corresponding to broadcasting signals having intensities smaller than the predetermined value among the plurality of broadcasting signals;

receiving signals outputted from a user in order to determine an operating frequency;

transforming the audio signal provided by the audio source generator into a broadcasting signal according to the operating frequency; and emitting the broadcasting signal.

6. The method of claim 5 further comprising setting the predetermined value to be a fixed value.

7. The method of claim 5 further comprising storing signals outputted from the user.

8. The method of claim 5 further comprising storing decision results of the intensities of the plurality of broadcasting signals.

9. A multimedia system comprising:

an audio source generator for outputting an audio signal;

an audio player device for receiving and playing frequency modulation broadcasting signals; and a radio signal transmitter coupled to the audio source generator, comprising:

a receiving end coupled to the audio source generator for receiving the audio signal provided by the audio source generator;

a reception antenna for receiving a plurality of broadcasting signals;

a decision unit coupled to the reception antenna for determining intensities of the plurality of broadcasting signals received by the reception antenna;

a selection unit for determining an operating frequency according to a decision result of the decision unit, comprising:

a display unit coupled to the decision unit for displaying frequencies corresponding to broadcasting signals having intensities smaller than a predetermined value among the plurality of broadcasting signals according to the decision result of the decision unit; and an input interface coupled to the decision unit and the modulation unit for receiving signals outputted from a user in order to determine the operating frequency;

a modulation unit coupled to the receiving end and the selection unit for transforming the audio signal provided by the audio source generator into a broadcasting signal according to the operating frequency determined by the selection unit; and a transmission antenna coupled to the modulation unit for emitting the broadcasting signal outputted from the modulation unit to the audio player device in order to play the broadcast signal by the audio player device wherein the predetermined value changes according to the intensities of the plurality of broadcasting signals.

10. The multimedia system of claim 9, wherein the predetermined value is a fixed value.

11. The multimedia system of claim 9 further comprising a storage unit coupled to the input interface for storing the determination result of the user.

* * * * *